April 11, 1944. C. J. LEMONT Re. 22,469

INSULATOR

Original Filed April 12, 1940

INVENTOR.

Clarence J. Lemont

BY

Chester W. Brown

ATTORNEY.

Reissued Apr. 11, 1944

Re. 22,469

UNITED STATES PATENT OFFICE 22,469

INSULATOR

Clarence J. Lemont, South Milwaukee, Wis., assignor to Line Material Company, Milwaukee, Wis., a corporation of Delaware Original No. 2,259,526, dated October 21, 1941, Serial No. 329,211, April 12, 1940. Application for reissue June 18, 1943, Serial No. 491,372

5 Claims. (Cl. 174—154)

This invention relates to improvements in porcelain insulator screw brackets and method of assembly and forming of parts thereof.

My copending application Serial No. 356,637 filed September 13, 1940, is a division of the present application and is directed to the subject matter disclosed herein.

It is an object of this invention to provide an insulator screw bracket comprising an insulator element, a unitary frame member adapted to receive the insulator element in fixed mounted position therewith, and a screw means operatively related with the frame member for mounting the bracket in operating position.

More particularly, it is an object to provide for an insulator screw bracket including a grooved insulator element, a unitary frame member comprising a cup-like base portion adapted to receive the lower part of the insulator element in embracing relationship therewith, and a pair of arm-like extensions adapted to be received in locked engagement with the grooved portion of the insulator element and held in fixed relationship therewith by means of a rivet extending through the insulator element.

Another object is to provide for an insulator screw bracket including a grooved insulator, a unitary frame member attached in reinforcing relationship to the insulator and provided with a screw receiving means formed in the base portion of the frame member in a manner to permit pivotal movement of a screw element which is freely received in the means, and to permit cooperation between the screw element and the insulator, thereby preventing the disengagement of the screw element from the screw receiving means.

Still another object is to provide for an insulator screw bracket, a frame member having a rigid recessed base portion apertured centrally thereof and adapted to receive a lag screw in a manner to permit threaded engagement of the screw with a comparatively thin support being immediately adjacent the base portion, thereby providing anchorage for the bracket and preventing splitting of the thin support due to an unthreaded section on the lag screw otherwise adjacent the base portion.

A further object is to provide a novel method of assembling the various parts of a screw bracket by providing a unitary frame member having a screw receiving means adapted to receive a screw element in either pivotal or rigid relationship with the frame member, the method comprising a minimum number of operations which are simple, efficient and economical.

In the drawing.

Like parts are designated by the same reference characters throughout the several views.

Figure 1:
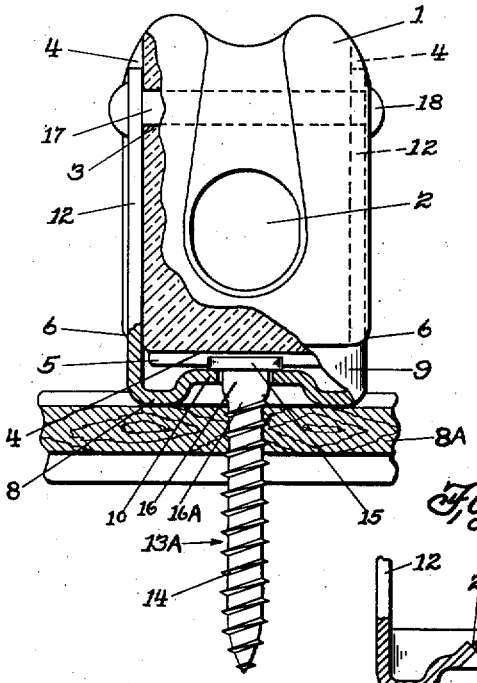
Fig. 1 is a view in side elevation showing the elements of the bracket partially in sectional view.

Fig. 1 illustrates a bracket comprising as a part of its structure an insulator 1 made preferably of porcelain and having a transverse aperture 2 adapted to receive an electrical conductor (not shown). The insulator is also provided with a smaller transverse aperture 3 disposed at right angles to the aperture 2 and spaced therefrom toward the upper end of the insulator. A channel 4 formed in the insulator 1 extends from one end of the aperture 3, across the lower end of the insulator and to the other end of the aperture 3 at the opposite side of the insulator. That portion of the channel 4 extending across the lower end of the insulator 1 provides arcuate leg portions 5 on the insulator. These legs are bounded at the upper ends thereof by shoulders 6—6.

Figure 3:
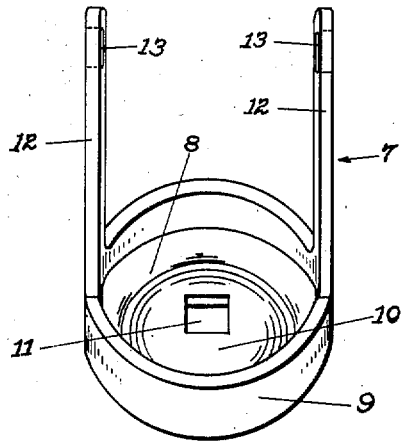
Fig. 3 is a perspective view of the unitary frame member.

The bracket further comprises as a part of its structure a unitary frame member designated generally by the numeral 7 and shown separately in Fig. 3. The frame member 7 comprises a base 8 which is formed upwardly at its periphery into a cylindrical wall portion 9 and deformed centrally of the base into a raised portion 10 which is provided centrally thereof with a square-like opening 11. A pair of arm portions 12—12 extend upwardly from the wall 9 in diametrically opposite relationship to the base 8. Apertures 13—13 are diametrically aligned relative to each other and are provided adjacent the upper ends of the arm portions 12—12.

The screw means 13A comprises a threaded portion 14, a circular head 15 and a squared shank portion 16 adjacent the head 15. It may be noted that adjacent the squared portion 16 of the screw there is an unthreaded section 16A.

This unthreaded section occurs at this point because it is expensive and in most cases impractical to provide threads flush with the head of the screw.

The screw means 13A and frame member 7 are assembled by inserting the screw means into the opening 11 so that the squared shank portion 16 comes into registry with the squared opening 11.

It may be noted that the assembled parts of the unit are held in nonrigid relationship to each other due to the dimensional differences of the opening 11 and the shank portion 16, thereby permitting a limited pivotal movement of the screw in the squared opening.

The assembled unit is mounted on the insulator 1 by engaging the arms 12—12 with the side grooves 4—4 and bringing the upper end of the cylindrical wall 9 into abutting relationship with the shoulders 6—6 and the apertures 13—13 into axial registry with the aperture 3. The frame member is secured in reinforcing relationship with the insulator 1 by means of a rivet 17 extending through the aperture 3 and headed at 18 to complete the assembly of the bracket.

It is to be noted that when the bracket is mounted on the side of a house, a portion of which is shown by the clapboard 8A, and the screw 13A extends between the studdings not shown, the only support for the bracket is the comparatively thin clapboard 8A. Accordingly it is desirable to provide threads adjacent the base portion 8 in order to secure the bracket tightly against the clapboard 8A and prevent splitting thereof which generally occurs in cases where the unthreaded portion 16A is disposed adjacent the base.

It is to be further noted that when the bracket is mounted in any suitable support, as for example the clapboard 8A and an electrical conductor not shown connected thereto, relative movement between the insulator 1 and the frame member 7 is prevented by the interlocking relationship of the arms 12—12 in the grooves 4—4 and the engagement of the legs 5 with the wall portion 9. It is to be still further noted that the clearance between the top of the head 15 and the bottom of the groove 4 permits a limited pivotal movement of the screw 13A, allowing the screw to be extended in angular relationship to the base 8; thereby allowing the base 8 to make firm, flat contact with the supporting surface 8A into which the bracket is mounted even though the screw 13A enters the support at an undesirable angle. It is further noted that the groove 4 cooperates with the head 15 to hold the screw 13A in the opening 11.

Figure 4:
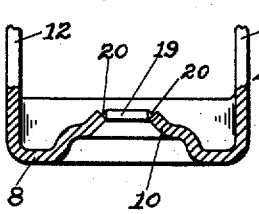
Fig. 4 is a fragmentary vertical sectional view showing the unitary frame member formed to receive a screw means in rigid relationship.
Figure 5:
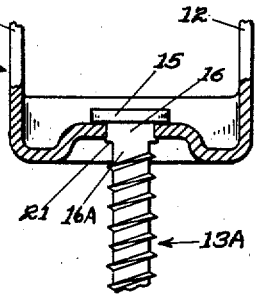
Fig. 5 shows the frame member illustrated in Fig. 4 associated in rigid relationship with a screw means.
Figure 2:
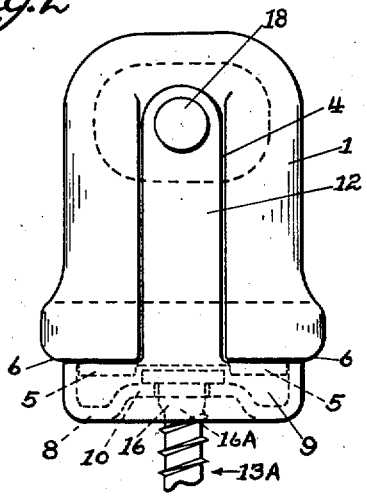
Fig. 2 is a vertical view taken at right angles relative to Fig. 1.

Figs. 4 and 5 illustrate the manner of assembly of the screw 13A in rigid relationship with the frame member 7. The base 8 of the frame member is first formed as shown in Fig. 5 having an opening 19 which is undersize relative to the dimension of the shank portion 16 of the screw. Therefore the base 10 is embossed or upset as shown in Fig. 4 to increase the distance between the opposed sides of the opening 19 sufficiently to freely receive the shank 16 of the screw. During this embossing operation the corners of the opening 19 are separated slightly as shown at 20.

After the screw 13A has been inserted in the upset aperture 19 a convenient means is employed to press against the screw head 15 forcing the sides of the opening 19 into gripping relationship with the shank 16 and at the same time upset the corners of the shank 16 into anchor portions 21 as shown in Fig. 5. The anchor portions 21 provide additional anchorage between the screw 13A and the frame 7.

The rigidly assembled screw 13A and frame member 7 are mounted relative to the insulator 1 in the manner heretofore described with reference to Fig. 1.

It may now be noted that a simple, improved method of assembly is provided for assembling the reinforcing frame member 7 of the insulator bracket with the screw means 13A and the insulator 1 using a minimum number of operations. It is further noted that an improved method of assembly is provided for assembling the screw means 13A in either an adjustable or rigid relationship with the frame member 7.

Figure 6:
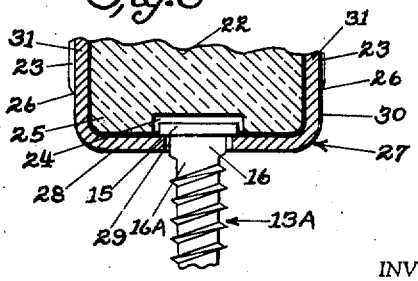
Fig. 6 is a fragmentary view in vertical section showing the elements of a modified bracket.

Fig. 6 shows a modified bracket comprising an insulator 22 similar to the insulator described with reference to Fig. 1, but provided with side grooves 23 and a recessed portion 24. A reduced portion 25 extends below the larger upper section of the insulator forming shoulders at 26.

The frame member 27 comprises a base 28 provided centrally thereof with a squared opening 29 and a wall portion 30 which extends upwardly into arms 31 in the manner described with reference to Fig. 3.

The screw 13A may be mounted in adjustable relationship with the frame member 27 and the assembled unit mounted on the insulator 22 in the manner described with reference to Fig. 1, except that the head 15 is received in the recessed portion 24 and the reduced portion 25 is received within the wall portion 30 of the base 28.

The insulator 22 is held in rigid relationship to the frame member 27 in the manner described with reference to Fig. 1.

If it is desired to provide a rigid relationship between the screw 13A and the frame 27, the opening 29 is undersize relative to the shank 16 and the parts are assembled as described with reference to Figs. 4 and 5.

From the foregoing description it is obvious that the objects of this invention have been attained by providing for an insulator screw bracket a unitary frame member which is associated in interlocked reinforcing relationship with the insulator and which is adapted to be assembled with a screw means in an adjustable or rigid relationship by a simple, effective and efficient method of assembly.

It is further obvious that an object of this invention has been attained by providing a frame member having a rigid recessed base portion apertured to receive a lag screw and dispose the threaded portion of the screw in flush relationship with the base.

I claim:

1. A bracket comprising an insulator having a transverse aperture and diametrically disposed grooves extending from said aperture to one end of said insulator, in combination with a unitary reinforcing frame comprising a substantially nonyielding cup-like base rigidly embracing said one end and a pair of arms integral with the base disposed in said grooves, means in said aperture securing said arms in said grooves, said base having a portion spaced from said one end providing a central inwardly dished portion on said base with a centrally disposed polygonal aperture in said dished portion, and a screw having an unthreaded portion of its shank complementary to said polygonal aperture and having a head disposed between said base and said one end of said insulator, the unthreaded portion of the screw shank being disposed in the inwardly dished portion of said base when the insulator is screwed home.

2. A bracket comprising an insulator having a transverse aperture and diametrically disposed grooves extending from said aperture to one end of said insulator, in combination with a unitary reinforcing frame comprising a substantially non-yielding cup-like base rigidly embracing said one end and a pair of arms integral with the base disposed in said grooves, means in said aperture securing said arms in said grooves, said base having a portion spaced from said one end providing a central inwardly dished portion on said base with a centrally disposed polygonal aperture in said dished portion, and a screw having an unthreaded portion of its shank complementary to said polygonal aperture and having a head disposed between said base and said one end of said insulator, the unthreaded portion of the screw shank being disposed in said inwardly dished portion of said base when the insulator is screwed home, the space between said base and said one end being greater than the depth of said head, whereby stresses produced in said screw will be transmitted to said insulator solely through said frame.

3. A bracket comprising an insulator having a transverse aperture and diametrically disposed grooves extending from said aperture to one end of said insulator, in combination with a unitary reinforcing frame comprising a substantially non-yielding cup-like base rigidly embracing said one end and a pair of arms integral with the base disposed in said grooves, means in said aperture securing said arms in said grooves, said base having a portion spaced from said one end providing a central inwardly dished portion on said base with a centrally disposed aperture in said dished portion defined by a plurality of angularly related sides, and a screw having an unthreaded portion of its shank disposed in said aperture and defined peripherally by a plurality of angularly related sides each engaging a corresponding side of said aperture and having a head disposed between said base and said one end of said insulator, the threaded portion of said screw extending to a plane substantially coinciding with the exterior seating surface of said base.

4. A bracket comprising an insulator having a transverse aperture and diametrically disposed grooves extending from said aperture to one end of said insulator, in combination with a unitary reinforcing frame comprising a substantially non-yielding cup-like base rigidly embracing said one end and a pair of arms integral with the base disposed in said grooves, means in said aperture securing said arms in said grooves, said base having a portion spaced from said one end providing a central inwardly dished portion on said base with a centrally disposed aperture in said dished portion defined by a plurality of angularly related sides, and a screw having an unthreaded portion of its shank disposed in said aperture and defined peripherally by a plurality of angularly related sides each engaging a corresponding side of said aperture and having a head disposed between said base and said one end of said insulator, the threaded portion of said screw extending to a plane substantially coinciding with the exterior seating surface of said base, the unthreaded shank being disposed substantially entirely within the space defined by said inwardly dished portion of said base when the insulator is screwed home, the space between said base and said one end being greater than the depth of said head, whereby stresses produced in said screw will be transmitted to said insulator solely through said frame.

5. The combination with a transversely apertured insulator having diametrically disposed grooves each extending from an end of said aperture to the same end of said insulator, a unitary reinforcing frame comprising a substantially non-yielding cup-like base rigidly embracing said same end of said insulator and a pair of arms integral with the base disposed in said grooves, and means in said aperture securing said arms in said grooves, said base having an apertured central portion inwardly dished toward said insulator and spaced therefrom; of a headed screw projecting through said aperture in said portion, said screw and apertured central portion having similarly contoured interlocking areas radially of said screw securing said base and screw against relative rotation, the head of said screw being disposed between said base and said insulator, said screw having an unthreaded portion of its shank adjacent said head disposed substantially entirely within the space defined by said inwardly dished portion when the insulator is screwed home.

CLARENCE J. LEMONT.